US011844062B2

(12) United States Patent
Abedini et al.

(10) Patent No.: US 11,844,062 B2
(45) Date of Patent: Dec. 12, 2023

(54) LOCAL INTERFERENCE MANAGEMENT IN AN INTEGRATED ACCESS BACKHAUL NETWORK

(71) Applicant: QUALCOMM Incorporated, San Diego, CA (US)

(72) Inventors: Navid Abedini, Somerset, NJ (US); Jianghong Luo, Skillman, NJ (US); Naeem Akl, Somerville, NJ (US); Tao Luo, San Diego, CA (US); Luca Blessent, Whitehouse Station, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 16/949,841

(22) Filed: Nov. 17, 2020

(65) Prior Publication Data

US 2021/0185704 A1 Jun. 17, 2021

Related U.S. Application Data

(60) Provisional application No. 62/947,775, filed on Dec. 13, 2019.

(51) Int. Cl.
*H04W 72/12* (2023.01)
*H04W 88/14* (2009.01)
*H04W 72/1263* (2023.01)
*H04W 72/50* (2023.01)
*H04W 72/542* (2023.01)

(52) U.S. Cl.
CPC ..... *H04W 72/1263* (2013.01); *H04W 72/535* (2023.01); *H04W 72/542* (2023.01); *H04W 88/14* (2013.01)

(58) Field of Classification Search
CPC . H04W 88/04; H04W 28/0278; H04W 24/10; H04W 72/082; H04L 5/16; H04L 1/0003; H04L 1/0025
See application file for complete search history.

(56) References Cited

U.S. PATENT DOCUMENTS

2019/0349079 A1* 11/2019 Novlan ............ H04W 72/0446
2019/0373627 A1* 12/2019 Luo ........................ H04L 1/0025
(Continued)

OTHER PUBLICATIONS

3GPP TSG RAN WG1#96, AT&T mechanism for resource coordination and radio aware scheduling for IAB R1-1901894 (Year: 2019).*

(Continued)

*Primary Examiner* — Romani Ohri
(74) *Attorney, Agent, or Firm* — Arun Swain

(57) ABSTRACT

Various aspects of the present disclosure generally relate to wireless communication. In some aspects, a child node of a parent node in an integrated access backhaul (IAB) network may determine communication information that includes one or more of a schedule or a configuration for a communication to be transmitted by the child node. The child node may be an IAB node, and the parent node may be an IAB donor or an intervening IAB node between the IAB node and an IAB donor. The child node may transmit the communication information to the parent node via a wireless backhaul link between the child node and the parent node. Numerous other aspects are provided.

27 Claims, 9 Drawing Sheets

(56) References Cited

U.S. PATENT DOCUMENTS

| | | | |
|---|---|---|---|
| 2020/0008218 A1* | 1/2020 | Shih | H04W 72/1205 |
| 2020/0145860 A1* | 5/2020 | Koskela | H04W 76/14 |
| 2020/0145967 A1* | 5/2020 | Park | H04W 72/27 |
| 2020/0351198 A1* | 11/2020 | Majmundar | H04L 43/0805 |
| 2021/0345321 A1* | 11/2021 | Wu | H04W 88/14 |
| 2021/0352523 A1* | 11/2021 | Wei | H04W 40/34 |
| 2021/0385868 A1* | 12/2021 | Ying | H04W 74/0833 |
| 2022/0038164 A1* | 2/2022 | Wei | H04W 88/14 |
| 2022/0124657 A1* | 4/2022 | Baldemair | H04W 56/0015 |
| 2022/0141686 A1* | 5/2022 | Korhonen | H04L 5/0048 370/252 |
| 2022/0167364 A1* | 5/2022 | Kurita | H04W 72/10 |

OTHER PUBLICATIONS

"3rd Generation Partnership Project, Technical Specification Group Radio Access Network, NG-RAN, F1 General Aspects and Principles (Release 15)", 3GPP Standard, Technical Specification, 3GPP TS 38.470. 3rd Generation Partnership Project (3GPP), Mobile Competence Centre, 650, Route Des Lucioles, F-06921 Sophia-Antipolis Cedex, France, vol. RAN WG3. No. V0.5.0. Dec. 10, 2017 (Dec. 10, 2017). pp. 1-11. XP051391836. [retrieved on Dec. 10, 2017] the whole document.

"3rd Generation Partnership Project; Technical Specification Group Radio Access Network; NR; Study on Integrated Access and Backhaul; (Release 16)", 3GPP Draft, 38.874, V16.0.0, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, Dec. 2018, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip, [retrieved on Jan. 11, 2019] Section 9.7, Cited in the Application, Paragraph 6 .1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB-donor/IAB-node, DU and IAB-Donor CU for Architecture Group, 1 72, p. 64-p. 72. Paragraph 7.3.1, paragraph 7.5.

"3rd Generation Partnership Project; Technical Specification Group Services and System Aspects; System Architecture for the 5G System (5GS); Stage 2 (Release 16)", 3GPP Standard; Technical Specification; 3GPP TS 23.501, 3rd Generation Partnership Project (3GPP), Mobile Competence Centre, 650, Route Des Lucioles, F-06921, Sophia-Antipolis Cedex, France, vol. SA WG2, No. V16.2.0, Sep. 24, 2019 (Sep. 24, 2019), pp. 1-389, XP051784669, Retrieved from the Internet: URL: ftp://ftp.3gpp.org/Specs/archive/23_series/23.501/23501-g20.zip23501-g20.doc, [retrieved on Sep. 24, 2019], Sections 5.9.2, 5.9.2a, 5.30.2, 5.9.4.5, p. 174-p. 191.

AT&T: "Mechanisms for Resource Coordination and Radio-Aware Scheduling for IAB", 3GPP Draft, 3GPP TSG RAN WG1 #96, R1-1901894, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 25, 2019-Mar. 1, 2019, Feb. 16, 2019 (Feb. 16, 2019), XP051599588, 6 Pages, Retrieved from the Internet: URL: http://www.3gpp.org/ftp/tsg%5Fran/WG1%5FRL1/TSGR1%5F96/Docs/R1%2D1901894%2Ezip. [retrieved on Feb. 16, 2019] the whole document.

AT&T: "Enhancements to Support NR Backhaul Links", 3GPP Draft, 3GPP TSG RAN WG1 Meeting #95, R1-1812859, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Nov. 11, 2018 (Nov. 11, 2018), XP051554822, 13 pages, Retrieved from the Internet: URL: http://www.3gpp.org/ftp/Meetings%5F3GPP%5FSYNC/RAN1/Docs/R1%2D1812859%2Ezip, [retrieved on Nov. 11, 2018], p. 6, paragraph 2.3-p. 10, paragraph 2.5, figures 7-10, p. 12, Line 1-Line 2, Section 1. Introduction Section 2: Physical Layer Enhancement for IAB, Section 2.3: Frame structure design and access and backhaull multiplexing Section 2.5: Crosslink interference considerations.

International Search Report and Written Opinion—PCT/US2020/070801—ISA/EPO—dated Feb. 24, 2021.

Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Lucioles, F-06921, Sophia-Antipolis Cedex, France, vol. Ran WG1, No. Gothenburg, Sweden, Aug. 20, 2018-Aug. 24, 2018, Aug. 17, 2018 (Aug. 17, 2018), XP051516809, 6 Pages. Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]-[0002].

* cited by examiner

LOCAL INTERFERENCE MANAGEMENT IN AN INTEGRATED ACCESS BACKHAUL NETWORK

CROSS-REFERENCE TO RELATED APPLICATION

This Patent Application claims priority to U.S. Provisional Patent Application No. 62/947,775, filed on Dec. 13, 2019, entitled "LOCAL INTERFERENCE MANAGEMENT IN AN INTEGRATED ACCESS BACKHAUL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for local interference management in an integrated access backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A radio access network may include a wireless backhaul network, sometimes referred to as an integrated access and backhaul (IAB) network. In an IAB network, at least one base station is an anchor base station that communicates with a core network via a wired backhaul link, such as a fiber connection. An anchor base station may also be referred to as an IAB donor (or IAB-donor). The IAB network may include one or more non-anchor base stations, sometimes referred to as relay base stations or IAB nodes (or IAB-nodes). An IAB node may communicate directly with or indirectly with the IAB donor via one or more backhaul links to form a backhaul path to the core network for carrying backhaul traffic. A backhaul link may be a wireless link. IAB nodes may communicate with one or more UEs via access links, which may be wireless links for carrying access traffic.

Millimeter wave technology or directional communications may be used for the wireless links between base stations of the IAB network and UEs. For example, wireless backhaul links between base stations may use millimeter waves to carry information or may be directed toward a target base station using beamforming or precoding. Similarly, wireless access links between a UE and a base station may use millimeter waves and/or may be directed toward a target UE or base station. Base stations of the IAB node network may use millimeter wave communications or other directional communications to reduce interference between cells of the base stations. However, neighboring base stations of the IAB network may still suffer intercell interference, which may reduce communication performance.

SUMMARY

In some aspects, a method of wireless communication, performed by a child node of a parent node in an integrated access backhaul (IAB) network, may include determining communication information that includes one or more of a schedule or a configuration for a communication by the child node and transmitting the communication information to the parent node via a wireless backhaul link between the child node and the parent node. The child node may be an IAB node, and the parent node may be an IAB donor or an intervening IAB node between the IAB node and an IAB donor.

In some aspects, a method of wireless communication, performed by a parent node of a child node in an IAB network, may include receiving, from the child node of the IAB network via a wireless backhaul link between the parent node and the child node, communication information associated with a communication to be transmitted by the child node. The communication information may include one or more of a schedule or a configuration for a communication by the child node. The child node may be an IAB node, and the parent node may be an IAB donor or an intervening IAB node between the IAB node and an IAB donor. The method may include determining one or more of a schedule or a configuration for a communication by the parent node based at least in part on the communication information associated with the communication by the child node. The method may include transmitting one or more of the communication by the parent node, communication information associated with the communication by the parent node, an interference estimate for the communication by the parent node, or an interference estimate for the communication by the child node.

In some aspects, a child node of a parent node in an IAB network may include memory and one or more processors operatively coupled to the memory. The memory and the one or more processors may be configured to determine communication information that includes one or more of a schedule or a configuration for a communication by the child node and transmit the communication information to the parent node via a wireless backhaul link between the child node and the parent node. The child node may be an IAB node, and the parent node may be an IAB donor or an intervening IAB node between the IAB node and an IAB donor.

In some aspects, a parent node of a child node in an IAB network for wireless communication may include memory and one or more processors operatively coupled to the memory. The memory and the one or more processors may be configured to receive, from the child node of the IAB network via a wireless backhaul link between the parent node and the child node, communication information associated with a communication to be transmitted by the child node. The communication information may include one or more of a schedule or a configuration for a communication by the child node. The child node may be an IAB node, and the parent node may be an IAB donor or an intervening IAB node between the IAB node and an IAB donor. The memory and the one or more processors may be configured to determine one or more of a schedule or a configuration for a communication by the parent node based at least in part on the communication information associated with the communication by the child node. The memory and the one or more processors may be configured to transmit one or more of the communication by the parent node, communication information associated with the communication by the parent node, an interference estimate for the communication by the parent node, or an interference estimate for the communication by the child node.

In some aspects, a non-transitory computer-readable medium may store one or more instructions for wireless communication. The one or more instructions, when executed by one or more processors of a child node of a parent node in an IAB network, may cause the one or more processors to determine communication information that includes one or more of a schedule or a configuration for a communication by the child node and transmit the communication information to the parent node via a wireless backhaul link between the child node and the parent node. The child node may be an IAB node, and the parent node may be an IAB donor or an intervening IAB node between the IAB node and an IAB donor.

In some aspects, a non-transitory computer-readable medium may store one or more instructions for wireless communication. The one or more instructions, when executed by one or more processors of a parent node of a child node in an IAB network, may cause the one or more processors to receive, from the child node of the IAB network via a wireless backhaul link between the parent node and the child node, communication information associated with a communication to be transmitted by the child node. The communication information may include one or more of a schedule or a configuration for a communication by the child node. The child node may be an IAB node, and the parent node may be an IAB donor or an intervening IAB node between the IAB node and an IAB donor. The one or more instructions, when executed by one or more processors of the parent node, may cause the one or more processors to determine one or more of a schedule or a configuration for a communication by the parent node based at least in part on the communication information associated with the communication by the child node and transmit one or more of the communication by the parent node, communication information associated with the communication by the parent node, an interference estimate for the communication by the parent node, or an interference estimate for the communication by the child node.

In some aspects, an apparatus for wireless communication may include means for determining communication information that includes one or more of a schedule or a configuration for a communication by the apparatus and means for transmitting the communication information to a parent node of the apparatus via a wireless backhaul link between the apparatus and the parent node. The child node may be an IAB node, and the parent node may be an IAB donor or an intervening IAB node between the IAB node and an IAB donor.

In some aspects, an apparatus for wireless communication may include means for receiving, from a child node of the apparatus via a wireless backhaul link between the apparatus and the child node, communication information associated with a communication to be transmitted by the child node. The communication information may include one or more of a schedule or a configuration for a communication by the child node. The child node may be an IAB node, and the parent node may be an IAB donor or an intervening IAB node between the IAB node and an IAB donor. The apparatus may also include means for determining one or more of a schedule or a configuration for a communication by the apparatus based at least in part on the communication information associated with the communication by the child node. The apparatus may include means for transmitting one or more of the communication by the parent node, communication information associated with the communication by the parent node, an interference estimate for the communication by the parent node, or an interference estimate for the communication by the child node.

Aspects generally include a method, apparatus, system, computer program product, non-transitory computer-readable medium, user equipment, base station, wireless communication device, parent node, child node, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
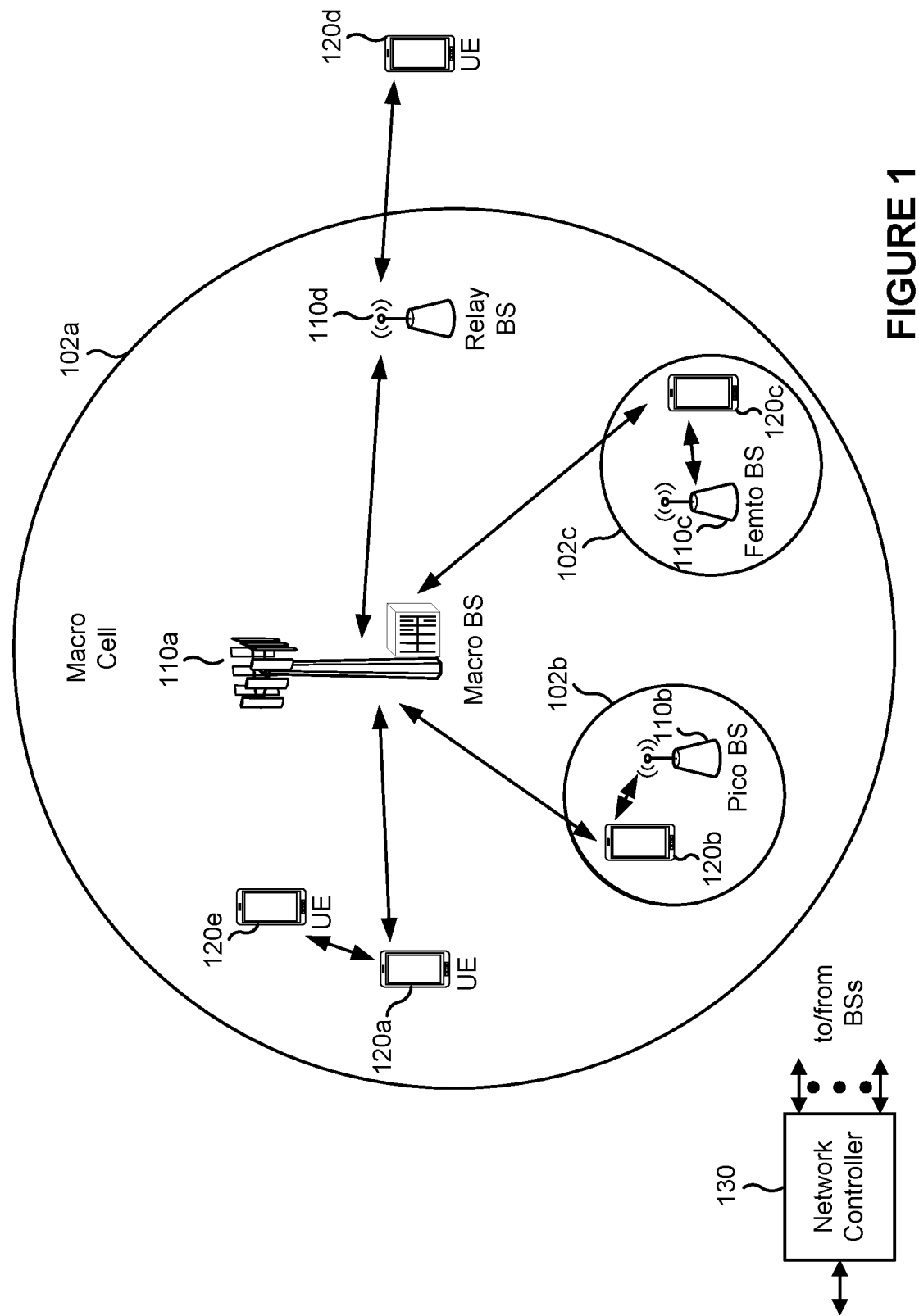
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented, or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Base stations of an integrated access backhaul (IAB) network, including IAB donors and IAB non-donor nodes, may use millimeter waves and directional communications to reduce interference between cells of the base stations. However, neighboring base stations may still suffer intercell interference, which may reduce communication performance. For example, an IAB node, such as a non-anchor base station, may interfere with communications transmitted by a parent node, such as an IAB donor or another intervening IAB node between the IAB node and the IAB donor. The IAB node may be referred to as a child node of the parent node.

Various aspects relate generally to an IAB node (child node) sharing communication information with a related IAB donor or intervening IAB node (parent node) via a wireless backhaul link, such as an F1 application protocol (F1-AP) interface. Some aspects more specifically relate to the child node sharing communication information that is associated with a future communication by the child node. In some aspects, the communication information may be referred to as a scheduling plan indication (SPI) and may include or indicate a schedule or configuration for the communication by the child node. The schedule may include a time, a frequency, and/or a priority of the communication. The configuration may include a beam index, a modulation and coding scheme (MCS), a target signal to noise plus interference ratio (SINR), a target transmit power, and/or a target receive power. The parent node may use the communication information to determine and transmit, back to the child node, communication information for a communication by the parent node. The parent node may also transmit the communication by the parent node. In some aspects, the parent node may transmit an SPI for the communication by the child node or an SPI for the communication by the parent node to other child nodes. In some aspects, the parent node may transmit the SPIs to a grandparent node if the parent node is also an IAB node.

Particular aspects of the subject matter described in this disclosure can be implemented to realize one or more of the following potential advantages. In some examples, the described techniques can be used to enable related IAB nodes and IAB donors that are local to each other to share an SPI for interference measurement, reporting, and/or coordination. With this information, base stations of the IAB network may be able to handle local interference more efficiently. This may improve a quality of communications in the IAB network. As a result, the IAB nodes and IAB donors may save processing and signaling resources that may have otherwise been consumed by identifying and remedying communications that experience interference.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110*a*, BS 110*b*, BS 110*c*, and BS 110*d*) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
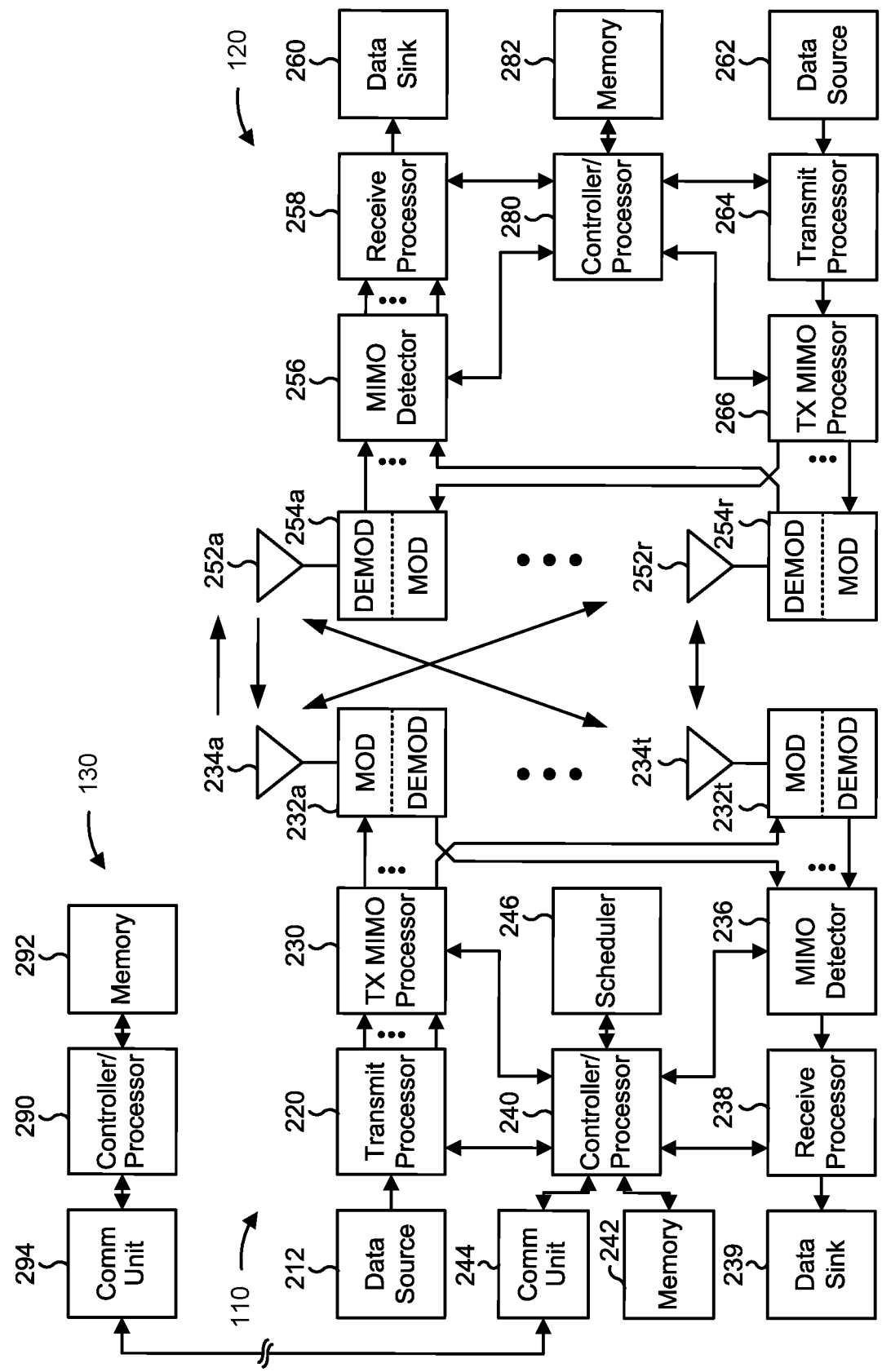
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more MCSs for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with interference management in an IAB network, as described in more detail elsewhere herein. For example, controller/processor 240 of base station 110, controller/processor 280 of UE 120, or any other component(s) of FIG. 2 may perform or direct operations of, for example, the process of FIG. 6, the process of FIG. 7, or other processes as described herein. Memories 242 and 282 may store data and program codes for base station 110 and UE 120, respectively. A scheduler 246 may schedule UEs for data transmission on the downlink or uplink.

In some aspects, base station 110 may be a child node of a parent node in an IAB network. The base station 110 may include means for determining communication information that includes one or more of a schedule or a configuration for a communication by the child node, means for transmitting the communication information to the parent node via a wireless backhaul link between the child node and the parent node, among other examples, or combinations thereof. In some aspects, such means may include one or more components of base station 110 described in connection with FIG. 2. The child node may be an IAB node, and the parent node may be an IAB donor or an intervening IAB node between the IAB node and an IAB donor.

In some aspects, base station 110 may be a parent node of a child node in an IAB network. The base station 110 may include means for receiving, from the child node of the IAB network via a wireless backhaul link between the parent node and the child node, communication information for the child node, the communication information including one or more of a schedule or a configuration for a communication by the child node, means for determining one or more of a schedule or a configuration for a communication by the parent node based at least in part on the communication information associated with the child node, means for transmitting one or more of the communication by the parent node, communication information associated with the communication by the parent node, an interference estimate for the communication by the parent node, or an interference estimate for the communication by the child node, among other examples, or combinations thereof. In some aspects, such means may include one or more components of base station 110 described in connection with FIG. 2. The child node may be an IAB node, and the parent node may be an IAB donor or an intervening IAB node between the IAB node and an IAB donor.

In some examples, the child node may interfere with communications transmitted by the parent node, or vice versa. For example, the parent node may transmit a communication at the same time that the child nodes transmits a communication. The communication by the parent node may interfere with the communication by the child node, by overlapping in time and by using a transmit power that is mismatched for reception by the child node. Such interference may cause degraded communications, and the child node and the parent node may consume processing resources and signaling resources identifying and remedying the degraded communications.

Various aspects relate generally to an IAB node (child node) sharing communication information with a related IAB donor or intervening IAB node (parent node) via a wireless backhaul link, such as an F1 application protocol (F1-AP) interface. For example, the child node may determine communication information associated with a communication by the child node and transmit the communication information associated with the communication by the child node to the parent node via a wireless backhaul link between the child node and the parent node. The communication information may include a schedule or a configuration for a communication by the child node. The parent node may determine a schedule or configuration for a communication by the parent node based at least in part on the communication information from the child node. In this way, the parent node may avoid interfering with the communication by the child node. The parent node and the child node may avoid degraded communications caused by interference. As a result, the child node and the parent node conserve processing resources and signaling resources that may have otherwise been consumed by identifying and remedying degraded communications.

In some aspects, the parent node may receive the communication information associated with the communication by the child node, determine communication information associated with a communication to be transmitted by the parent node based at least in part on the communication information associated with the communication by the child node, and transmit the communication information associated with the communication by the parent node back to the child node via the wireless backhaul link.

In some aspects, the child node may modify the schedule or configuration for the communication by the child node based at least in part on the communication information received from the parent node.

In some aspects, the child node or the parent node may estimate interference for the communication by the child node or a communication to be transmitted by the parent node and transmit interference information to the other node. Whichever node receives this interference information may modify a schedule or configuration for its own communication.

Figure 3:
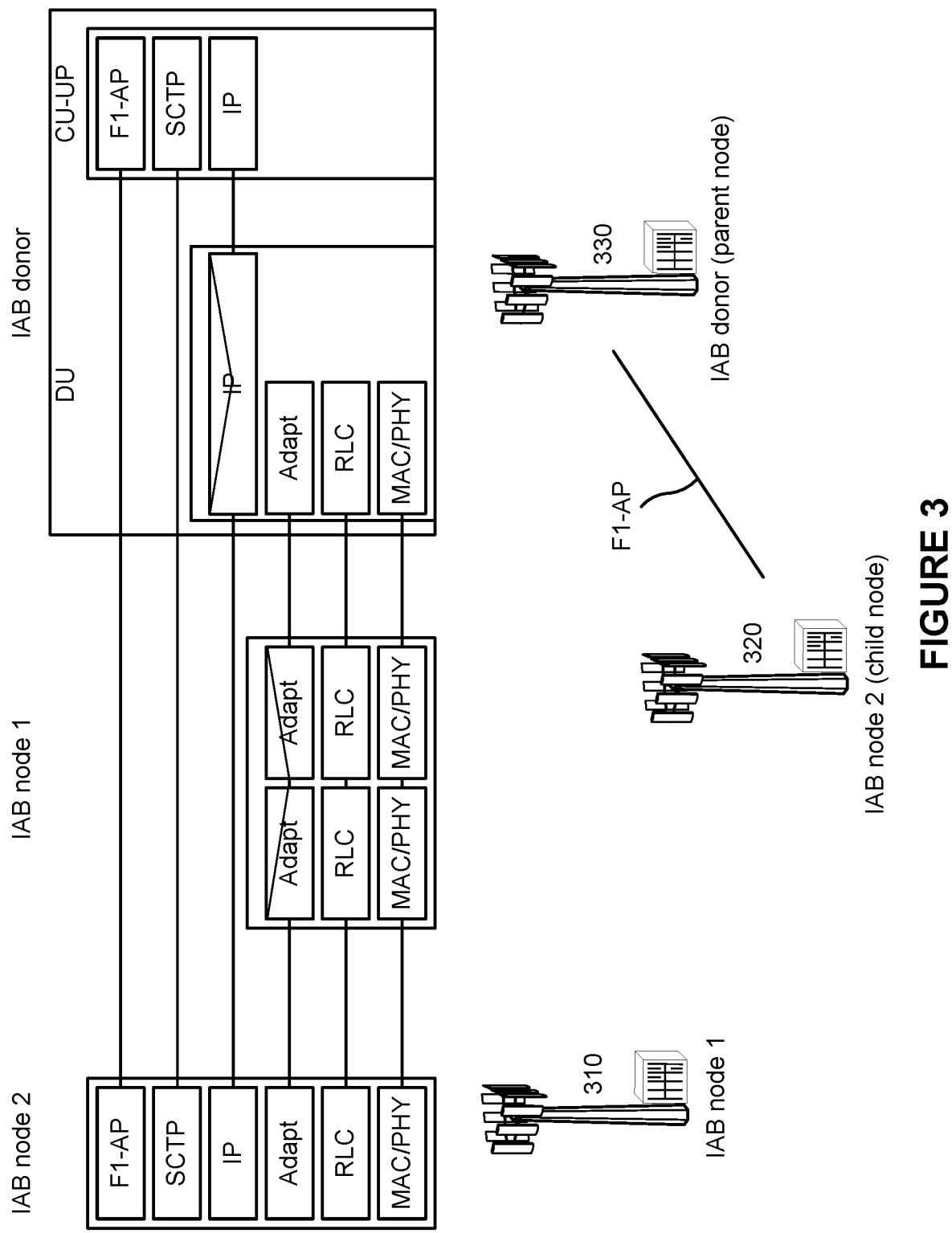
FIG. 3 is a diagram illustrating interference management in an integrated access backhaul (IAB) network.

FIG. 3 is a diagram illustrating interference management in an IAB network. A first IAB node 310 (such as BS 110 depicted and described in FIGS. 1 and 2) and a second IAB node 320 (such as another BS 110) may communicate with an IAB donor 330 (such as yet another BS 110). Each of IAB node 310 or IAB node 320 may be or include a distributed unit (gNB-DU). IAB donor 330 may be or include a central unit (gNB-CU). In the example of FIG. 3, IAB donor 330 may be a parent node of IAB node 320 (child node) and may control IAB node 320.

In the example of FIG. 3, IAB donor 330 is a parent node of IAB node 320. Note that in some scenarios, another IAB node, rather than IAB donor 330, may be the parent of IAB node 320. In such a scenario, an IAB donor may be a parent node of the other IAB node, and that IAB donor may be considered to be a grandparent of IAB node 320.

FIG. 3 also shows a control plane protocol stack for IAB node 310, IAB node 320, and IAB donor 330. For example, a protocol stack for a wireless backhaul link of IAB node 310 may include an adaptation layer, a radio link control (RLC) layer, a medium access control (MAC) layer and a physical (PHY) layer. A protocol stack for IAB node 320 may include an adaptation layer, an RLC layer, a MAC layer and a PHY layer, and may additionally include an internet protocol (IP) layer, a stream control transmission protocol (SCTP) layer, and an F1 application protocol (F1-AP) layer. A protocol stack for a backhaul link or an interface of IAB donor 330 may include an IP layer, an adaptation layer, an RLC layer, a MAC and PHY layer. A protocol stack for another interface of IAB donor 330 may include an IP layer, an SCTP layer, and an F1-AP layer.

IAB node 320 and IAB donor 330 may be related and may share a backhaul link. The backhaul link may be a wireless backhaul link, such as an F1-AP interface. Additionally or alternatively, IAB node 320 and IAB donor 330 may share an Xn-C interface. Additionally or alternatively, IAB node 320 and IAB donor 330 may pass information over a Uu interface.

Figure 4:
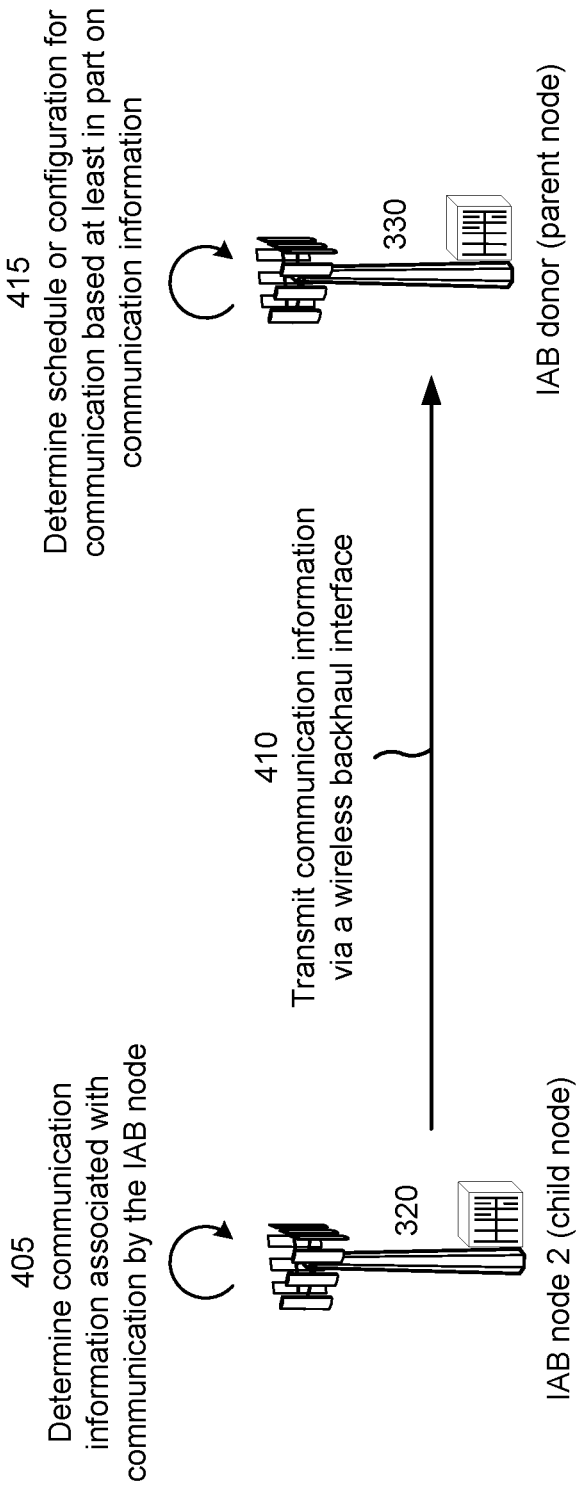
FIG. 4 is a diagram illustrating interference management in the IAB network of FIG. 3.

FIG. 4 is a diagram illustrating interference management in the IAB network of FIG. 3. At a first operation 405, IAB node 320 may determine communication information that includes a schedule, a configuration, or both a schedule and a configuration for a communication to be transmitted by IAB node 320. The schedule may involve communication resources, such as time and/or frequency resources, and/or a priority of the communication. The configuration may include an antenna configuration or a beam configuration. For example, the configuration may include a beam index, an MCS, a target SINR, a target receive power, and/or a target transmit power. In some aspects, the communication information may also include a buffer status or a type of communication. IAB node 320 may determine the communication information by copying information for the schedule for the communication by IAB node 320 into the communication information or copying information for the configuration for the communication by IAB node 320 into the communication information.

In some aspects, the communication to be transmitted by IAB node 320 via the wireless backhaul link is a reference signal. The communication information may include a schedule or a configuration for the reference signal. For example, the communication information may indicate a time resource, a frequency resource, and a beam index for the reference signal. IAB donor 330, by receiving the schedule and/or configuration via the wireless backhaul link, may schedule and configure a communication such that transmission of the communication does not overlap or interfere with the reference signal transmitted by IAB node 320.

At a second operation 410, IAB node 320 may transmit the communication information associated with the communication by IAB node 320 to IAB donor 330 via a wireless backhaul link, such as an F1-AP interface, an Xn-C interface, or a Uu interface. IAB node 320 may transmit the communication information to IAB donor 330 in uplink control information or a MAC control element. The transmitting of the communication information may be periodic, semi-persistent, triggered by an event, based at least in part on a request from IAB donor 330, or may proceed in accordance with a dynamic pattern. IAB donor 330 may receive the communication information. In some aspects, IAB node 320 may request, from IAB donor 330, an opportunity or scheduled time to transmit the communication information.

At a third operation 415, IAB donor 330 may determine a schedule or configuration associated with a communication to be transmitted by IAB donor 330 based at least in part on the communication information received from IAB node 320. For example, IAB donor 330 may determine a schedule or a configuration for the communication by IAB donor 330 so as to avoid interfering with or being interfered by the communication by IAB node 320, for example, by avoiding transmitting the communication by IAB donor 330 at the same time as IAB node 320 transmits the communication by IAB node 320. In some aspects, the communication information from IAB node 320 may include a configuration for the communication by IAB node 320. The configuration may include a beam index, a target receive power, a target transmit power, an MCS, and/or a target SINR. IAB node 320 may transmit the configuration and receive a communication from IAB donor 330 based at least in part on the configuration. For example, IAB donor 330 may use a beam index that does not conflict with a beam index used for the communication by IAB node 320.

In some aspects, the communication information may be associated with one or more links between IAB node 320 and one or more nodes that are child nodes of IAB node 320.

In some aspects, an IAB node may be multi-connected (have multiple parents) under the same IAB donor. For example, one parent may be IAB donor 330 and another parent may be an IAB node that is directly or indirectly connected to IAB donor 330. This scenario may provide more reliability in the case that the link to IAB donor 330 drops. IAB node 320 may still have another indirect link to IAB donor 330 (through the other IAB node). In some aspects, an IAB node may be connected to two IAB donors (directly or indirectly). For example, on one leg the IAB node may be directly connected to a first IAB donor, and on a second leg the IAB node may be connected to a second IAB donor or another IAB node that is connected to the second IAB donor. In some aspects, communication information associated with a communication to be transmitted may be associated with one or more links between IAB node 320 and one or more other parent nodes of IAB node 320.

Figure 5:
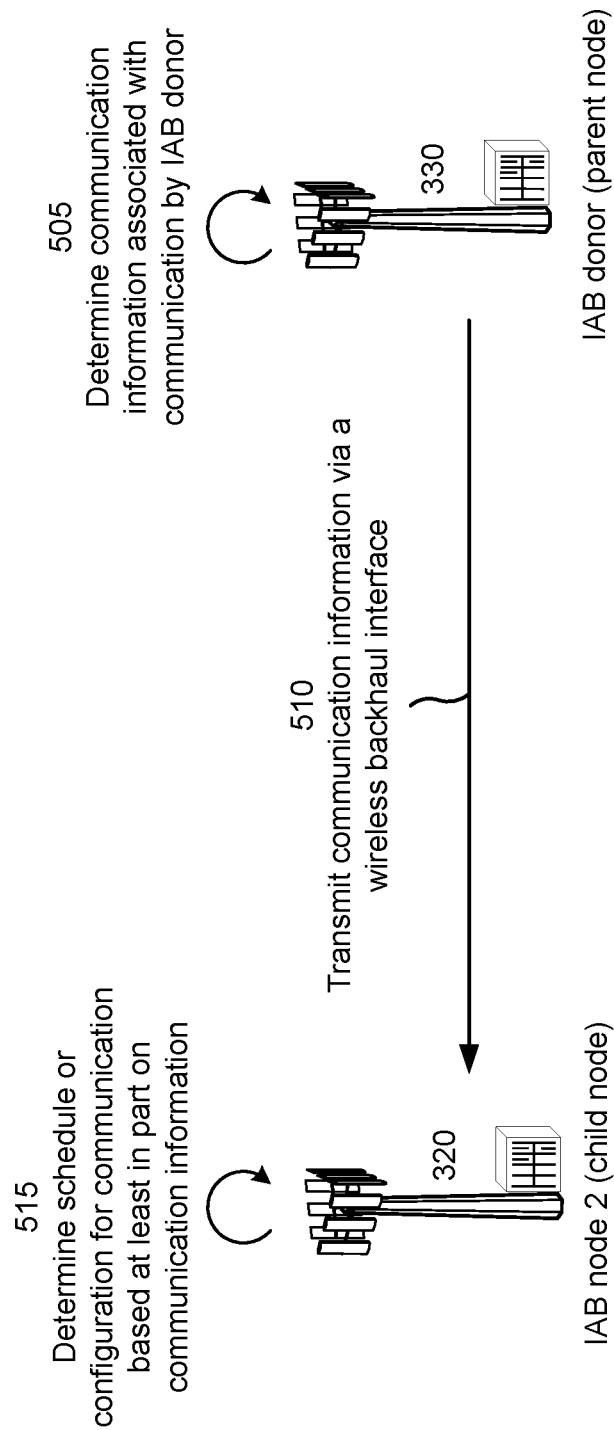
FIG. 5 is a diagram illustrating interference management in the IAB network of FIG. 3.

FIG. 5 is a diagram illustrating interference management in the IAB network of FIG. 3. In some aspects, at a fourth operation 505, IAB donor 330 may determine communication information associated with the communication to be transmitted by IAB donor 330, based at least in part on the schedule or configuration for the communication by IAB donor 330. At a fifth operation 510, IAB donor 330 may transmit the communication information associated with the communication by IAB donor 330 to IAB node 320 via the interface. At a sixth operation 515, IAB node 320 may determine (or modify) the schedule or configuration for the communication to be transmitted by IAB node 320. For example, the schedule or configuration for the communication by IAB node 320 may be changed to account for a schedule or a configuration of the communication by IAB donor 330, as indicated by the communication information associated with the communication by IAB donor 330. A plan (for a schedule or a configuration) may be modified by canceling part of the plan for the schedule or the configuration, changing a beam direction, changing a transmission power or rate, or changing a modulation and coding scheme. Operations 505, 510 and 515 may be a continuation from operation 415.

In this way, IAB node 320 and IAB donor 330, which are local to each other and related, may share information for coordinating transmission schedules and for avoiding interference. With this information, each IAB node or IAB donor may be able to handle local interference more efficiently. This may improve a quality of communications in the IAB network and save processing and signaling resources that may be spent handling communications that may experience interference.

In some aspects, information for other related IAB nodes may be involved. For example, IAB donor 330 may transmit communication information associated with the communication to be transmitted by IAB donor 330 to other child nodes. In an example where a parent node is an IAB node, the IAB node may transmit communication information to a grandparent node that is a parent of the IAB node. In some aspects, IAB donor 330 may transmit, to IAB node 320, communication information associated with one or more links between IAB donor 330 and the grandparent node (grandparent information).

In some aspects, IAB node 320 may determine an interference estimate for a communication to be transmitted by IAB node 320, based at least in part on the communication information that was received from IAB donor 330, and transmit the interference estimate to IAB donor 330 via the interface. In some aspects, IAB node 320 may transmit the interference estimate with communication information. In some aspects, IAB node 320 may transmit the interference estimate separate from communication information.

In some aspects, the communication information may assist with interference estimation. IAB node 320 may determine an interference estimate for a communication to be transmitted by IAB donor 330, based at least in part on the schedule or the configuration determined for the communication by IAB donor 330, such as shown in reference to operation 415. IAB node 320 may transmit the interference estimate to IAB donor 330 via the interface.

Likewise, in some aspects, IAB donor 330 may determine an interference estimate for the communication to be transmitted by IAB donor 330, based at least in part on the communication information that was received from IAB node 320, and transmit the interference estimate to IAB node 320. In some aspects, IAB donor 330 may determine an interference estimate for the communication to be transmitted by IAB node 320, based at least in part on the schedule or the configuration determined for the communication by IAB donor 330 (or IAB node 320), and transmit the interference estimate to IAB node 320.

In some aspects, IAB node 320 or IAB donor 330 may measure interference and transmit interference information to another node. Interference information may include measurements that involve a received signal strength indicator (RSSI) or a reference signal received power (RSRP). IAB donor 330 or IAB node 320 (whichever node is performing the measurements) may estimate interference using information about time and frequency resources of a signal to measure, a transmission power of the signal, or a transmission configuration indicator of the signal.

In some aspects, the communication information may include information about a configuration of reference signals that are transmitted. Such reference signals may include a synchronization signal block, a channel state information reference signal, a demodulation reference signal, a tracking reference signal, a sounding reference signal, or a random access channel signal. In this way, IAB donor 330 or IAB node 320 may obtain a better interference measurement, such as a RSRP instead of an RSSI.

Based at least in part on the operations described in connection with FIGS. 3-5, related IAB nodes may share information to manage interference and to improve communications.

Figure 6:
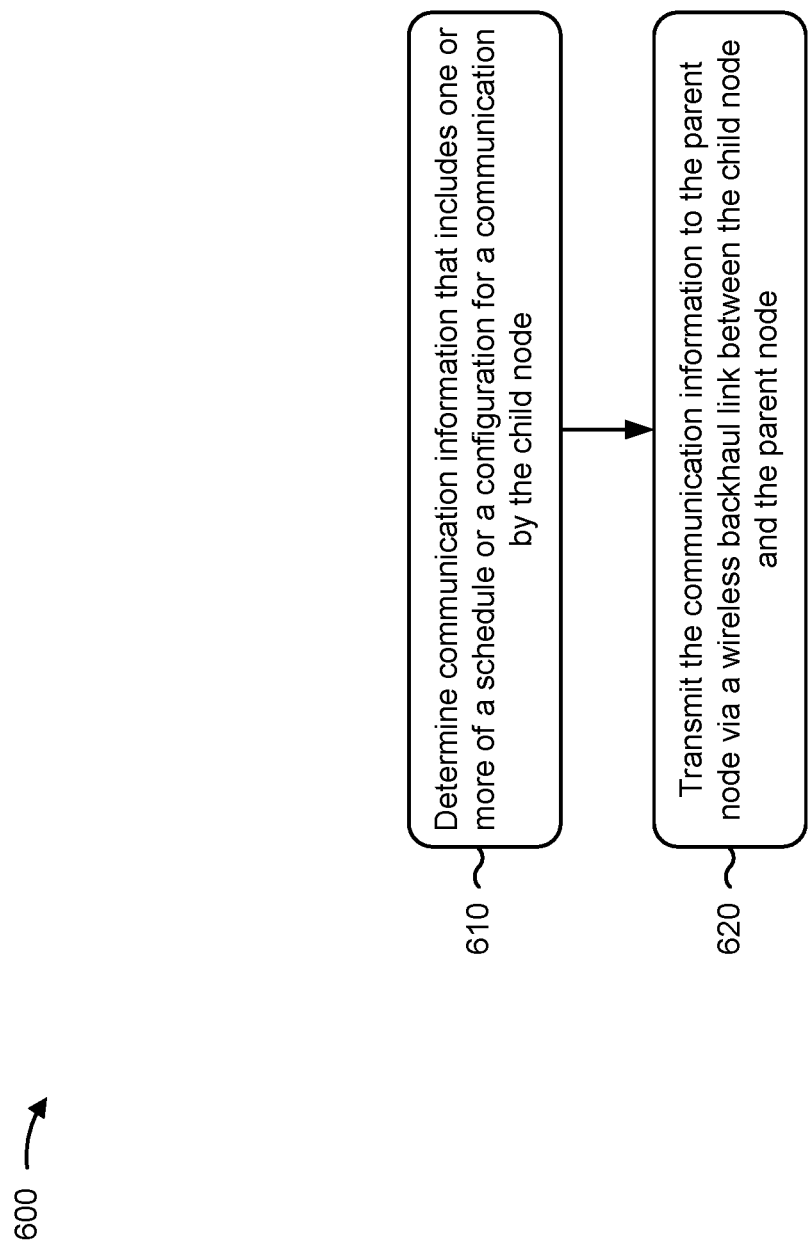
FIG. 6 is a flowchart illustrating an example process performed, for example, by a child node of a parent node in an IAB network, in accordance with various aspects of the present disclosure.

FIG. 6 is a flowchart illustrating an example process 600 performed, for example, by a child node of a parent node in an IAB network, in accordance with various aspects of the present disclosure. The example process is an example where a child node (for example, IAB node 320) of a parent node performs operations relating to interference management in an IAB network. The child node may be an IAB node, and the parent node may be an IAB donor or an intervening IAB node between the IAB node and an IAB donor.

As shown in FIG. 6, in some aspects, process 600 may include determining communication information that includes one or more of a schedule or a configuration for a communication by the child node (block 610). For example, the child node (for example, using controller/processor 240 or memory 242 depicted in FIG. 2, or using schedule component 812 depicted in FIG. 8) may determine communication information that includes one or more of a schedule or a configuration for a communication by the child node, as described above.

As further shown in FIG. 6, in some aspects, process 600 may include transmitting the communication information to the parent node via a wireless backhaul link between the child node and the parent node (block 620). For example, the child node (for example, using transmit processor 220, controller/processor 240, or memory 242 depicted in FIG. 2, or using transmission component 806 depicted in FIG. 8) may transmit the communication information to the parent node via a wireless backhaul link between the child node and the parent node, as described above.

Process 600 may include additional aspects, such as any single aspect or any combination of aspects described below and/or in connection with one or more other processes described elsewhere herein.

In a first additional aspect, transmitting the communication information includes transmitting the schedule for the communication by the child node via the wireless backhaul link, and wherein the method further comprises receiving a communication from the parent node that does not overlap with the schedule for the communication by the child node.

In a second additional aspect, alone or in combination with the first aspect, transmitting the communication information includes transmitting the configuration for the communication by the child node via the wireless backhaul link, the configuration including one or more of a beam index, a target receive power, a target transmit power, a modulation and coding scheme, or a target signal to noise plus interference ratio, and wherein the method further comprises receiving a communication from the parent node based at least in part on the configuration.

In a third additional aspect, alone or in combination with one or more of the first and second aspects, process 600 includes receiving communication information associated with a communication to be transmitted by the parent node based at least in part on the transmitting of the communication information associated with the communication by the child node, determining the schedule or the configuration of the communication by the child node based at least in part on the communication information associated with the communication by the parent node, and transmitting the communication by the child node based at least in part on the modified schedule or configuration.

In a fourth additional aspect, alone or in combination with one or more of the first through third aspects, process 600 includes determining an interference estimate for the communication by the parent node, based at least in part on the determining of the schedule or the configuration for the communication by the child node, and transmitting the interference estimate to the parent node via the wireless backhaul link.

In a fifth additional aspect, alone or in combination with one or more of the first through fourth aspects, process 600 includes receiving communication information associated with a communication to be transmitted by the parent node based at least in part on the transmitting of the communication information associated with the communication by the child node, determining interference on a link between the parent node and the child node based at least in part on the communication information associated with the communication by the parent node, modifying the schedule or the configuration of the communication by the child node based at least in part on the determined interference, and transmitting the communication by the child node based at least in part on the modified schedule or configuration.

In a sixth additional aspect, alone or in combination with one or more of the first through fifth aspects, the communication information includes a schedule or a configuration for one or more links between the child node and one or more nodes that are child nodes of the child node.

In a seventh additional aspect, alone or in combination with one or more of the first through sixth aspects, the communication information includes a schedule or a configuration for one or more links between the child node and other parent nodes of the child node.

In an eighth additional aspect, alone or in combination with one or more of the first through seventh aspects, process 600 includes receiving communication information associated with a communication to be transmitted by the parent node, wherein the communication information associated with the communication by the parent node includes grandparent information that is associated with one or more links between the parent node and a grandparent node that is a parent of the parent node, and transmitting the communication by the child node based at least in part on the grandparent information.

In a ninth additional aspect, alone or in combination with one or more of the first through eighth aspects, the communication information includes one or more of a schedule, a time and frequency location, a beam index, a modulation and coding scheme, a target signal-to-interference-plus-noise ratio, a target receive power, a target transmit power, a buffer status, a type of communication, or a priority of communication.

In a tenth additional aspect, alone or in combination with one or more of the first through ninth aspects, the communication information includes a configuration for a reference signal.

In an eleventh additional aspect, alone or in combination with one or more of the first through tenth aspects, the wireless backhaul link is one of an F1 application protocol interface, an Xn-C interface, or a Uu interface.

In a twelfth additional aspect, alone or in combination with one or more of the first through eleventh aspects, process 600 includes transmitting, to the parent node, a request to schedule the child node for transmitting the communication information to the parent node, and wherein the transmitting includes transmitting the communication information based at least in part on transmitting the request.

In a thirteenth additional aspect, alone or in combination with one or more of the first through twelfth aspects, process 600 includes receiving a request for the communication information from the parent node, and wherein the transmitting includes transmitting the communication information based at least in part on receiving the request.

In a fourteenth additional aspect, alone or in combination with one or more of the first through thirteenth aspects, process 600 includes determining a periodic pattern, a semi-persistent pattern, an event, or a dynamic pattern, and wherein the transmitting includes transmitting the communication information based at least in part on the periodic pattern, the semi-persistent pattern, the event, or the dynamic pattern.

In a fifteenth additional aspect, alone or in combination with one or more of the first through fourteenth aspects, the communication information is associated with one or more links between the child node and one or more nodes that are child nodes of the child node.

In a sixteenth additional aspect, alone or in combination with one or more of the first through fifteenth aspects, the communication information is associated with one or more links between the child node and other parent nodes of the child node.

In a seventeenth additional aspect, alone or in combination with one or more of the first through sixteenth aspects, process 600 includes transmitting, to the parent node, a request to schedule the child node for transmitting the communication information to the parent node.

In an eighteenth additional aspect, alone or in combination with one or more of the first through seventeenth aspects, the transmitting is based at least in part on receiving a request for the communication information from the parent node.

In a nineteenth additional aspect, alone or in combination with one or more of the first through eighteenth aspects, the transmitting includes transmitting the communication information based at least in part on a periodic pattern, a semi-persistent pattern, an event, or a dynamic pattern.

In a twentieth additional aspect, alone or in combination with one or more of the first through nineteenth aspects, process 600 includes receiving communication information associated with a communication to be transmitted by the parent node and determining interference on a link between the parent node and the child node based at least in part on the communication information associated with the communication by the parent node.

In a twenty-first additional aspect, alone or in combination with one or more of the first through twentieth aspects, process 600 includes receiving communication information associated with a communication to be transmitted by the parent node that is associated with one or more links between the parent node and a grandparent node that is a parent of the parent node.

In a twenty-second additional aspect, alone or in combination with one or more of the first through twenty-first aspects, process 600 includes receiving communication information associated with a communication to be transmitted by the parent node and determining one or more of a schedule or a configuration for the communication by the child node based at least in part on the communication information associated with the communication by the parent node.

In a twenty-third additional aspect, alone or in combination with one or more of the first through twenty-second aspects, the determining includes modifying the one or more of a schedule or a configuration of the communication for the child node based at least in part on the received communication information.

In a twenty-fourth additional aspect, alone or in combination with one or more of the first through twenty-third aspects, process 600 includes determining an interference estimate for a communication by the parent node, based at least in part on the determining of the one or more of a schedule or a configuration for the communication by the child node and transmitting the interference estimate to the parent node via the interface.

In a twenty-fifth additional aspect, alone or in combination with one or more of the first through twenty-fourth aspects, process 600 includes receiving communication information associated with a communication to be transmitted by the parent node, determining an interference estimate for a communication by the child node based at least in part on the communication information associated with the communication by the parent node, and transmitting the interference estimate to the parent node via the interface.

Figure 7:
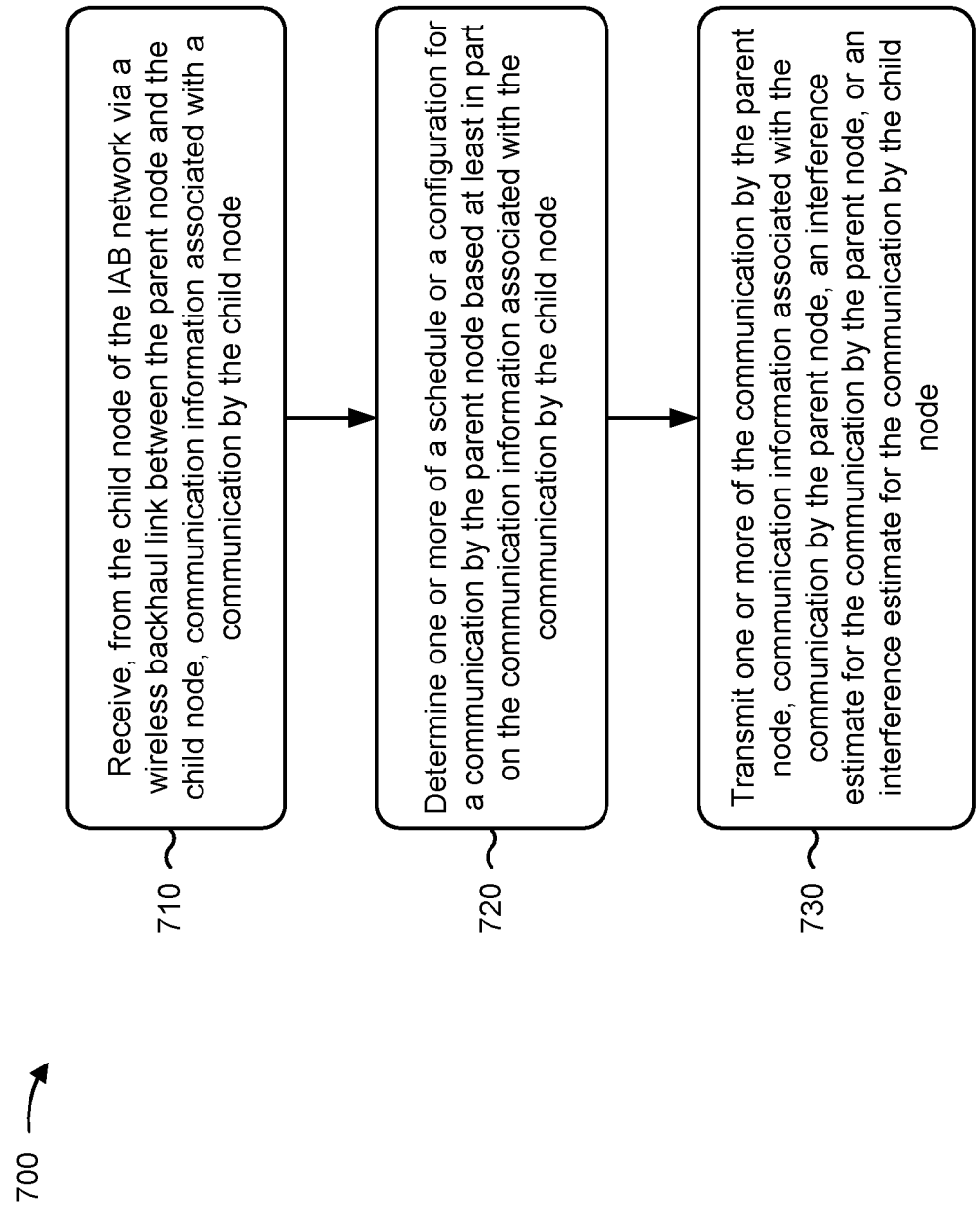
FIG. 7 is a flowchart illustrating an example process performed, for example, by a parent node of a child node in an IAB network, in accordance with various aspects of the present disclosure.

FIG. 7 is a diagram illustrating an example process 700 performed, for example, by a parent node of a child node in an IAB network, in accordance with various aspects of the present disclosure. Process 700 is an example where a parent node (for example, IAB donor 330) performs operations relating to interference management in an IAB network. The child node may be an IAB node, and the parent node may be an IAB donor or an intervening IAB node between the IAB node and an IAB donor.

As shown in FIG. 7, in some aspects, process 700 may include receiving, from the child node of the IAB network via a wireless backhaul link between the parent node and the child node, communication information associated with a communication to be transmitted by the child node, (block 710). In some aspects, the communication information includes one or more of a schedule or a configuration for a communication by the child node. For example, the parent node (for example, using receive processor 238, controller/processor 240, or memory 242 depicted in FIG. 2, or using reception component 902 depicted in FIG. 9) may receive, from the child node of the IAB network via a wireless backhaul link between the parent node and the child node, communication information associated with the communication by the child node, as described above.

As further shown in FIG. 7, in some aspects, process 700 may include determining one or more of a schedule or a configuration for a communication by the parent node based at least in part on the communication information associated with the communication by the child node (block 720). For example, the parent node (for example, using controller/processor 240 or memory 242 depicted in FIG. 2, or using schedule component 914 depicted in FIG. 9) may determine one or more of a schedule or a configuration for a communication by the parent node based at least in part on the communication information associated with the communication by the child node, as described above.

As further shown in FIG. 7, in some aspects, process 700 may include transmitting one or more of the communication by the parent node, communication information associated with the communication by the parent node, an interference estimate for the communication by the parent node, or an interference estimate for the communication by the child node (block 730). For example, the parent node (for example, using controller/processor 240 or memory 242 depicted in FIG. 2, or using transmission component 906 depicted in FIG. 9) may transmit one or more of the communication by the parent node, communication information associated with the communication by the parent node, an interference estimate for the communication by the parent node, or an interference estimate for the communication by the child node, as described above.

Process 700 may include additional aspects, such as any single aspect or any combination of aspects described below and/or in connection with one or more other processes described elsewhere herein.

In a first additional aspect, the transmitting includes determining the communication information associated with the communication by the parent node, based at least in part on the schedule or the configuration for the communication by the parent node, and transmitting the communication information associated with the communication by the parent node to the child node via the wireless backhaul link.

In a second additional aspect, alone or in combination with the first aspect, the communication information associated with the communication by the child node includes interference information corresponding to a link between the parent node and the child node, where the determining includes determining the schedule or the configuration for the communication by the parent node based at least in part on the interference information, and where the transmitting includes transmitting the communication by the parent node based at least in part on the schedule or the configuration.

In a third additional aspect, alone or in combination with one or more of the first and second aspects, process 700 includes receiving grandparent information that includes communication information associated with a communication to be transmitted by a grandparent node that is a parent of the parent node, and transmitting the grandparent information to one or more of the child node via the wireless backhaul link, or another child node of the parent node via another wireless backhaul link.

In a fourth additional aspect, alone or in combination with one or more of the first through third aspects, process 700 includes transmitting the communication information associated with the communication by the child node to a grandparent node that is a parent of the parent node, or another child node of the parent node via a wireless backhaul link.

In a fifth additional aspect, alone or in combination with one or more of the first through fourth aspects, process 700 includes determining interference on a link between the parent node and the child node based at least in part on the communication information associated with the communication by the child node, modifying the schedule or the configuration of the communication by the parent node based at least in part on the determined interference, and where the transmitting includes transmitting the communication by the parent node based at least in part on the modified schedule or the modified configuration.

In a sixth additional aspect, alone or in combination with one or more of the first through fifth aspects, process 700 includes determining the interference estimate for the communication by the parent node based at least in part on the communication information associated with the communication by the child node, and where the transmitting includes transmitting the interference estimate for the communication by the parent node to the child node via the wireless backhaul link.

In a seventh additional aspect, alone or in combination with one or more of the first through sixth aspects, the transmitting includes determining the interference estimate for the communication by the child node, based at least in part on the one or more of a schedule or a configuration for the communication by the parent node, and where the transmitting includes transmitting the interference estimate for the communication by the child node to the child node via the wireless backhaul link.

In an eighth additional aspect, alone or in combination with one or more of the first through seventh aspects, the wireless backhaul link is one of an F1 application protocol interface, an Xn-C interface, or a Uu interface.

In a ninth additional aspect, alone or in combination with one or more of the first through eighth aspects, process 700 includes transmitting a request to the child node to modify one or more of a schedule or a configuration for another communication by the child node.

In a tenth additional aspect, alone or in combination with one or more of the first through ninth aspects—process 700 includes determining communication information associated with a communication to be transmitted by the parent node, based at least in part on the one or more of a schedule or a configuration for the communication by the parent node, and transmitting the communication information associated with the communication by the parent node to the child node via the interface.

In an eleventh additional aspect, alone or in combination with one or more of the first through tenth aspects, process 700 includes transmitting the communication information associated with the communication to be transmitted by the parent node based at least in part on the receiving of the communication information associated with the communication by the child node via the interface.

In a twelfth additional aspect, alone or in combination with one or more of the first through eleventh aspects, the communication information associated with the communication to be transmitted by the child node includes interference information corresponding to a link between the parent node and the child node.

In a thirteenth additional aspect, alone or in combination with one or more of the first through twelfth aspects, process 700 includes receiving communication information associated with a communication to be transmitted by a grandparent node that is a parent of the parent node, and transmitting the communication information associated with the communication by the grandparent node to one or more of the child node, or another child node of the parent node.

In a fourteenth additional aspect, alone or in combination with one or more of the first through thirteenth aspects, process 700 includes transmitting the communication information associated with the communication to be transmitted by the child node to a grandparent node that is a parent of the parent node, or another child node of the parent node.

In a fifteenth additional aspect, alone or in combination with one or more of the first through fourteenth aspects, process 700 includes determining interference on a link between the parent node and the child node based at least in part on the communication information associated with the communication by the child node.

In a sixteenth additional aspect, alone or in combination with one or more of the first through fifteenth aspects, the parent node is an IAB donor.

In a seventeenth additional aspect, alone or in combination with one or more of the first through sixteenth aspects, the determining includes modifying the one or more of a schedule or a configuration of the communication for the parent node in relation to received communication information.

In an eighteenth additional aspect, alone or in combination with one or more of the first through seventeenth aspects, process 700 includes determining an interference estimate for the communication by the parent node based at least in part on the communication information associated with the communication to be transmitted by the child node and transmitting the interference estimate to the child node.

In a nineteenth additional aspect, alone or in combination with one or more of the first through eighteenth aspects, process 700 includes determining an interference estimate for a communication by the child node, based at least in part on the one or more of a schedule or a configuration for the communication by the parent node and transmitting the interference estimate to the child node.

In a twentieth additional aspect, alone or in combination with one or more of the first through nineteenth aspects, the interface is one of an F1-AP interface, an Xn-C interface, or a Uu interface.

In a twenty-first additional aspect, alone or in combination with one or more of the first through twentieth aspects, process 700 includes further comprising transmitting a request to the child node to modify one or more of a schedule or a configuration for another communication by the child node.

Figure 8:
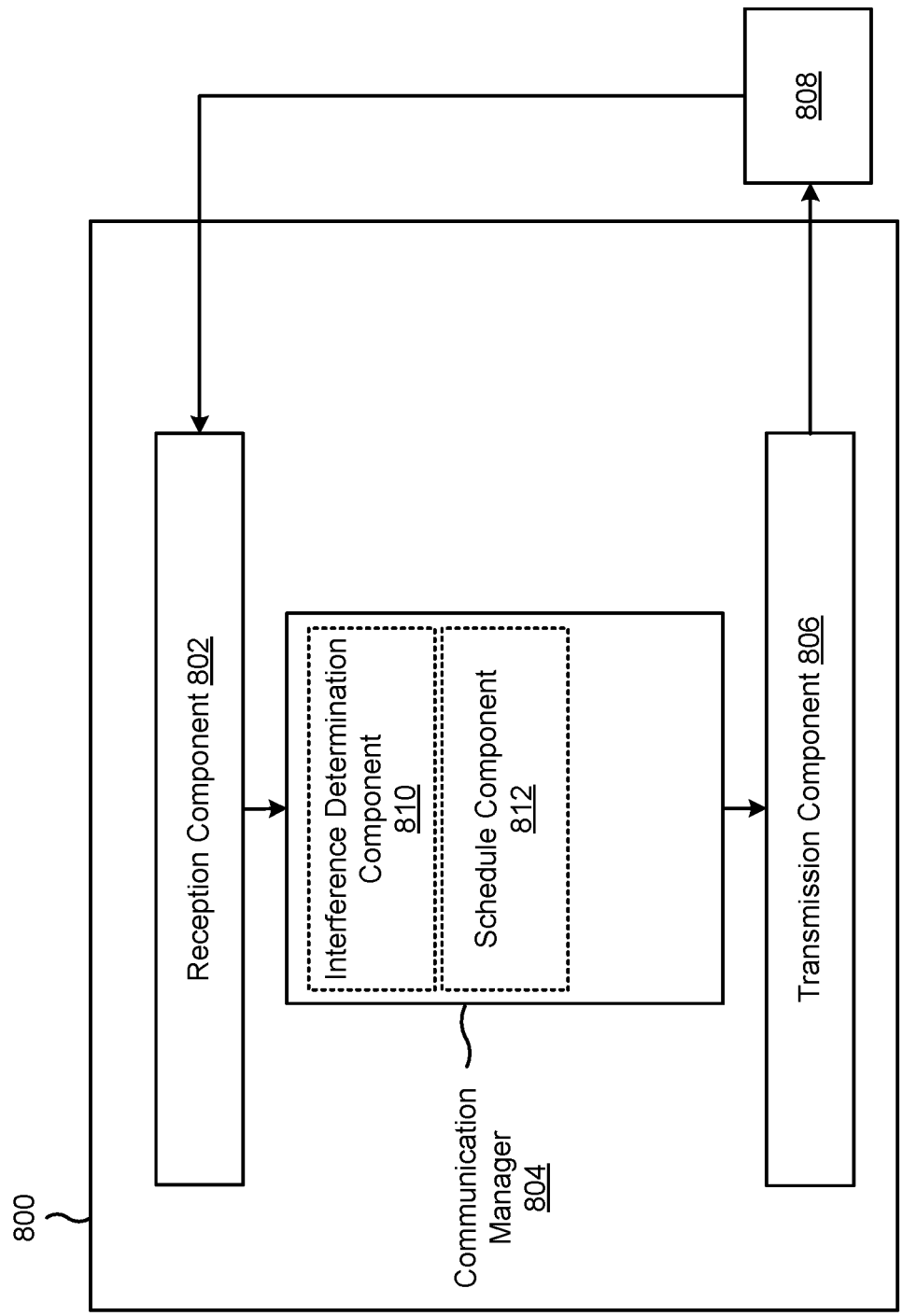
FIG. 8 is a block diagram of an example apparatus for wireless communication in accordance with various aspects of the present disclosure.

FIG. 8 is a block diagram of an example apparatus 800 for wireless communication in accordance with various aspects of the present disclosure. The apparatus 800 may be a child node of a parent node in an IAB network, or a child node may include the apparatus 800. The child node may be an IAB node, and the parent node may be an IAB donor or an intervening IAB node between the IAB node and an IAB donor. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 1-5. Additionally or alternatively, the apparatus 800 may be configured to perform one or more processes described herein, such as process 600 of FIG. 6. In some aspects, the apparatus 800 may include one or more components of the child node described above in connection with FIGS. 2 and 3.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the child node described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the child node described above in connection with FIG. 2. In some aspects, the transmission component 806 may be co-located with the reception component 802 in a transceiver.

The communication manager 804 may determine communication information that includes one or more of a schedule or a configuration for a communication by the child node. The communication manager 804 may transmit or may cause the transmission component 806 to transmit the communication information to the parent node via a wireless backhaul link between the child node and the parent node. In some aspects, the communication manager 804 may perform one or more operations described elsewhere herein as being performed by one or more components of the communication manager 804.

The communication manager 804 may include a controller/processor, a memory, a scheduler, a communication unit, or a combination thereof, of the child node described above in connection with FIG. 2. In some aspects, the communication manager 804 includes a set of components, such as an interference determination component 810, a schedule component 812, or a combination thereof. Alternatively, the set of components may be separate and distinct from the communication manager 804. In some aspects, one or more components of the set of components may include or may be implemented within a controller/processor, a memory, a scheduler, a communication unit, or a combination thereof, of the child node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The schedule component 812 may determine communication information that includes one or more of a schedule or a configuration for a communication by the child node. The transmission component 806 may transmit the communication information to the parent node via a wireless backhaul link between the child node and the parent node. The transmission component 806 may transmit, to the parent node, a request to schedule the child node for transmitting the communication information to the parent node.

The reception component 802 may receive communication information associated with a communication to be transmitted by the parent node based at least in part on the transmitting of the communication information associated with the communication by the child node. The schedule component 812 may determine the schedule or the configuration of the communication by the child node based at least in part on the communication information associated with the communication by the parent node. The transmission component 806 may transmit the communication by the child node based at least in part on the modified schedule or configuration.

The interference determination component 810 may determine an interference estimate for the communication by the parent node, based at least in part on the determining of the schedule or the configuration for the communication by the child node. The transmission component 806 may transmit the interference estimate to the parent node via the wireless backhaul link.

The reception component 802 may receive communication information associated with a communication to be transmitted by the parent node based at least in part on the transmitting of the communication information associated with the communication by the child node. The interference determination component 810 may determine interference on a link between the parent node and the child node based at least in part on the communication information associated with the communication by the parent node. The schedule component 812 may modify the schedule or the configuration of the communication by the child node based at least in part on the determined interference. The transmission component 806 may transmit the communication by the child node based at least in part on the modified schedule or configuration.

The reception component 802 may receive communication information associated with a communication to be transmitted by the parent node, wherein the communication information associated with the communication by the parent node includes grandparent information that is associated with one or more links between the parent node and a grandparent node that is a parent of the parent node.

The transmission component 806 may transmit the communication by the child node based at least in part on the grandparent information. The transmission component 806 may transmit, to the parent node, a request to schedule the child node for transmitting the communication information to the parent node.

The reception component 802 may receive a request for the communication information from the parent node. The schedule component 812 may determine a periodic pattern, a semi-persistent pattern, an event, or a dynamic pattern. The interference determination component 810 may determine interference on a link between the parent node and the child node based at least in part on the communication information associated with the communication by the parent node.

The reception component 802 may receive communication information associated with a communication to be transmitted by the parent node that is associated with one or more links between the parent node and a grandparent node that is a parent of the parent node. The reception component 802 may receive communication information associated with a communication to be transmitted by the parent node. The schedule component 812 may determine one or more of a schedule or a configuration for the communication by the child node based at least in part on the communication information associated with the communication by the parent node.

The interference determination component 810 may determine an interference estimate for the communication by the parent node, based at least in part on the determining of the one or more of a schedule or a configuration for the communication by the child node. The transmission component 806 may transmit the interference estimate to the parent node via the wireless backhaul link. The reception component 802 may receive communication information associated with a communication to be transmitted by the parent node.

The interference determination component 810 may determine an interference estimate for a communication by the child node based at least in part on the communication information associated with the communication by the parent node. The transmission component 806 may transmit the interference estimate to the parent node via the wireless backhaul link.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
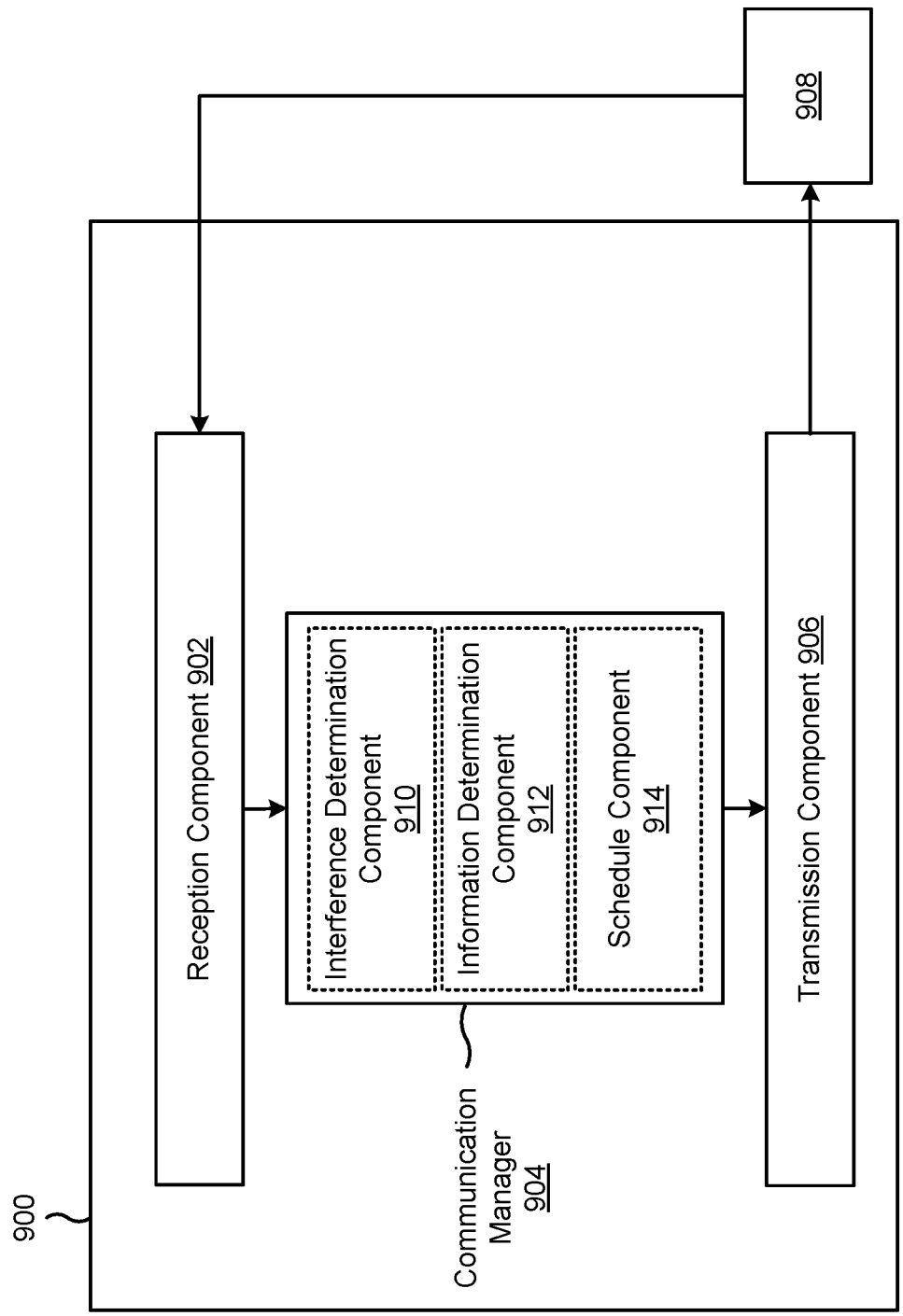
FIG. 9 is a block diagram of an example apparatus 900 for wireless communication in accordance with various aspects of the present disclosure.

FIG. 9 is a block diagram of an example apparatus 900 for wireless communication in accordance with various aspects of the present disclosure. The apparatus 900 may be a parent node in an IAB network, or a parent node may include the apparatus 900. The child node may be an IAB node, and the parent node may be an IAB donor or an intervening IAB node between the IAB node and an IAB donor. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 1-5. Additionally or alternatively, the apparatus 900 may be configured to perform one or more processes described herein, such as process 700 of FIG. 7. In some aspects, the apparatus 900 may include one or more components of the parent node described above in connection with FIGS. 2 and 3.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the parent node described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the parent node described above in connection with FIG. 2. In some aspects, the transmission component 906 may be co-located with the reception component 902 in a transceiver.

The communication manager 904 may receive or may cause the reception component 902 to receive, from the child node of the IAB network via a wireless backhaul link between the parent node and the child node, communication information associated with a communication to be transmitted by the child node, the communication information including one or more of a schedule or a configuration for the communication by the child node. The communication manager 904 may determine one or more of a schedule or a configuration for a communication by the parent node based at least in part on the communication information associated with the communication by the child node. The transmission component 906 may transmit one or more of the communication by the parent node, communication information associated with the communication by the parent node, an interference estimate for the communication by the parent node, or an interference estimate for the communication by the child node. In some aspects, the communication manager 904 may perform one or more operations described elsewhere herein as being performed by one or more components of the communication manager 904.

The communication manager 904 may include a controller/processor, a memory, a scheduler, a communication unit, or a combination thereof, of the parent node described above in connection with FIG. 2. In some aspects, the communication manager 904 includes a set of components, such as an interference determination component 910, an information determination component 912, or a combination thereof. Alternatively, the set of components may be separate and distinct from the communication manager 904. In some aspects, one or more components of the set of components may include or may be implemented within a controller/processor, a memory, a scheduler, a communication unit, or a combination thereof, of the parent node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from the child node of the IAB network via a wireless backhaul link between the parent node and the child node, communication information associated with a communication to be transmitted by the child node, the communication information including one or more of a schedule or a configuration for the communication by the child node. The child node may be an IAB node, and the parent node may be an IAB donor or an intervening IAB node between the IAB node and an IAB donor. The schedule component 914 may determine one or more of a schedule or a configuration for a communication by the parent node based at least in part on the communication information associated with the communication by the child node. The transmission component 906 may transmit one or more of the communication by the parent node, communication information associated with the communication by the parent node, an interference estimate for the communication by the parent node, or an interference estimate for the communication by the child node.

The reception component 902 may receive grandparent information that includes communication information associated with a communication to be transmitted by a grandparent node that is a parent of the parent node.

The transmission component 906 may transmit the grandparent information to one or more of the child node via the wireless backhaul link, or another child node of the parent node via another wireless backhaul link.

The transmission component 906 may transmit the communication information associated with the communication by the child node to a grandparent node that is a parent of the parent node, or another child node of the parent node via a wireless backhaul link.

The interference determination component 910 may determine interference on a link between the parent node and the child node based at least in part on the communication information associated with the communication by the child node.

The schedule component 914 may modify the schedule or the configuration of the communication by the parent node based at least in part on the determined interference.

The interference determination component 910 may determine the interference estimate for the communication by the parent node based at least in part on the communication information associated with the communication by the child node.

The transmission component 906 may transmit a request to the child node to modify one or more of a schedule or a configuration for another communication by the child node.

The information determination component 912 may determine communication information associated with the communication by the parent node, based at least in part on the one or more of a schedule or a configuration for the communication by the parent node.

The transmission component 906 may transmit the communication information associated with the communication by the parent node to the child node via the wireless backhaul link.

The transmission component 906 may transmit the communication information associated with the communication by the parent node based at least in part on the receiving of the communication information associated with the communication by the child node via the wireless backhaul link.

The reception component 902 may receive communication information associated with a communication to be transmitted by a grandparent node that is a parent of the parent node.

The transmission component 906 may transmit the communication information associated with the communication by the grandparent node to one or more of the child node, or another child node of the parent node.

The transmission component 906 may transmit the communication information associated with the communication by the child node to a grandparent node that is a parent of the parent node, or another child node of the parent node.

The interference determination component 910 may determine interference on a link between the parent node and the child node based at least in part on the communication information associated with the communication by the child node.

The interference determination component 910 may determine an interference estimate for the communication by the parent node based at least in part on the communication information associated with the communication by the child node.

The transmission component 906 may transmit the interference estimate to the child node.

The interference determination component 910 may determine an interference estimate for a communication by the child node, based at least in part on the one or more of a schedule or a configuration for the communication by the parent node.

The transmission component 906 may transmit the interference estimate to the child node.

The transmission component 906 may transmit a request to the child node to modify one or more of a schedule or a configuration for another communication by the child node.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a child node of a parent node in an integrated access backhaul (IAB) network, comprising:
    transmitting communication information to the parent node via a wireless backhaul link between the child node and the parent node, the child node being an IAB node, and the parent node being an IAB donor or an intervening IAB node between the IAB node and an IAB donor, the communication information including a configuration for a communication by the child node, the configuration including a beam index and one or more of a target receive power or a target transmit power;
    receiving, from the parent node, interference information associated with the communication responsive to transmitting the communication information to the parent node, the interference information indicating that a communication to be transmitted by the parent node overlaps in time with the communication by the child node;
    modifying one or both of a schedule or the configuration for the communication in accordance with the interference information; and
    transmitting the communication in accordance with the modified one or both of the schedule or the configuration.

2. The method of claim 1, wherein transmitting the communication information includes transmitting the schedule for the communication by the child node via the wireless backhaul link, and wherein the method further comprises receiving a communication from the parent node that does not overlap with the schedule for the communication by the child node.

3. The method of claim 1, wherein the configuration includes one or more of a modulation and coding scheme or a target signal to noise plus interference ratio, and wherein the method further comprises receiving a communication from the parent node in accordance with the configuration.

4. The method of claim 1, further comprising:
    receiving communication information associated with another communication to be transmitted by the parent node responsive to the transmitting of the communication information associated with the communication by the child node,
    wherein modifying the one or both of the schedule or the configuration of the communication by the child node includes:
        determining the one or both of the schedule or the configuration in accordance with the communication information associated with the other communication by the parent node.

5. The method of claim 4, further comprising:
    determining an interference estimate for the other communication by the parent node, in accordance with the determining of the one or both of the schedule or the configuration for the communication by the child node; and
    transmitting the interference estimate to the parent node via the wireless backhaul link.

6. The method of claim 1, further comprising:
    receiving communication information associated with the communication to be transmitted by the parent node responsive to the transmitting of the communication information associated with the communication by the child node; and determining interference on a link between the parent node and the child node in accordance with the communication information associated with the communication to be transmitted by the parent node, wherein the schedule or the configuration of the communication by the child node is modified in accordance with the determined interference.

7. The method of claim 1, wherein the communication information includes a schedule or a configuration for one or more links between the child node and one or more nodes that are child nodes of the child node.

8. The method of claim 1, wherein the communication information includes a schedule or a configuration for one or more links between the child node and other parent nodes of the child node.

9. The method of claim 1, further comprising:
receiving communication information associated with another communication to be transmitted by the parent node, wherein the communication information associated with the other communication to be transmitted by the parent node includes grandparent information that is associated with one or more links between the parent node and a grandparent node that is a parent of the parent node; and transmitting the communication by the child node in accordance with the grandparent information.

10. The method of claim 1, wherein the communication information includes one or more of a schedule, a time and frequency location, a modulation and coding scheme, a target signal-to-interference-plus-noise ratio, a buffer status, a type of communication, or a priority of communication.

11. The method of claim 1, wherein the communication information includes a configuration for a reference signal.

12. The method of claim 1, wherein the wireless backhaul link is one of an F1 application protocol interface, an Xn-C interface, or a Uu interface.

13. The method of claim 1, further comprising:
transmitting, to the parent node, a request to schedule the child node for transmitting the communication information to the parent node; and wherein the transmitting the communication information includes transmitting the communication information responsive to transmitting the request.

14. The method of claim 1, further comprising:
receiving a request for the communication information from the parent node; and wherein the transmitting the communication information includes transmitting the communication information in accordance with receiving the request.

15. The method of claim 1, further comprising:
determining a periodic pattern, a semi-persistent pattern, an event, or a dynamic pattern; and wherein the transmitting the communication information includes transmitting the communication information in accordance with the periodic pattern, the semi-persistent pattern, the event, or the dynamic pattern.

16. A method of wireless communication performed by a parent node of a child node in an integrated access backhaul (IAB) network, comprising:
receiving, from the child node of the TAB network via a wireless backhaul link between the parent node and the child node, communication information associated with a communication to be transmitted by the child node, the communication information including a configuration for the communication by the child node, the configuration including a beam index and one or more of a target receive power or a target transmit power, the child node being an IAB node, and the parent node being an IAB donor or an intervening IAB node between the IAB node and an IAB donor, one or both of a schedule or a configuration for a communication by the parent node being determined in accordance with the communication information associated with the communication by the child node;

transmitting interference information for the communication by the parent node, the interference information indicating that the communication by the parent node overlaps in time with the communication by the child node; and receiving the communication by the child node in accordance with a modified schedule or a modified configuration, the communication by the child node being received in accordance with the modified schedule or the modified configuration responsive to transmitting the interference information for the communication by the parent node.

17. The method of claim 16, wherein the transmitting includes:
determining communication information associated with the communication by the parent node, in accordance with the schedule or the configuration for the communication by the parent node; and transmitting the communication information associated with the communication by the parent node to the child node via the wireless backhaul link.

18. The method of claim 17, wherein the communication information associated with the communication to be transmitted by the child node includes interference information corresponding to a link between the parent node and the child node, wherein the determining includes determining the schedule or the configuration for the communication by the parent node in accordance with the interference information, and wherein the transmitting includes transmitting the communication by the parent node in accordance with the schedule or the configuration.

19. The method of claim 16, further comprising:
receiving grandparent information that includes communication information associated with a communication to be transmitted by a grandparent node that is a parent of the parent node; and transmitting the grandparent information to one or more of the child node via the wireless backhaul link, or another child node of the parent node via another wireless backhaul link.

20. The method of claim 16, further comprising transmitting the communication information associated with the communication to be transmitted by the child node to a grandparent node that is a parent of the parent node, or another child node of the parent node via a wireless backhaul link.

21. The method of claim 16, further comprising:
determining interference on a link between the parent node and the child node in accordance with the communication information associated with the communication to be transmitted by the child node; and modifying the schedule or the configuration of the communication by the parent node in accordance with the determined interference; and wherein the transmitting includes transmitting the communication by the parent node in accordance with the modified schedule or the modified configuration.

22. The method of claim 16, further comprising:
  determining an interference estimate for the communication by the parent node in accordance with the communication information associated with the communication to be transmitted by the child node; and
  wherein the transmitting includes transmitting the interference estimate for the communication by the parent node to the child node via the wireless backhaul link.

23. The method of claim 16, wherein the transmitting includes:
  determining an interference estimate for the communication by the child node, in accordance with the one or more of the schedule or the configuration for the communication by the parent node; and
  wherein the transmitting includes transmitting the interference estimate for the communication by the child node to the child node via the wireless backhaul link.

24. The method of claim 16, wherein the wireless backhaul link is one of an F1 application protocol interface, an Xn-C interface, or a Uu interface.

25. The method of claim 16, further comprising transmitting a request to the child node to modify one or more of a schedule or a configuration for another communication by the child node.

26. A child node of a parent node in an integrated access backhaul (IAB) network, comprising:
  one or more memories storing processor-readable code; and
  one or more processors coupled with the one or more memories, at least one of the one or more processors operable to cause the child node to:
    transmit communication information to the parent node via a wireless backhaul link between the child node and the parent node, the child node being an IAB node, and the parent node being an IAB donor or an intervening IAB node between the IAB node and an IAB donor, the communication information including a configuration for a communication by the child node, the configuration including a beam index and one or more of a target receive power or a target transmit power;
    receive, from the parent node, interference information associated with the communication responsive to transmitting the communication information to the parent node, the interference information indicating that a communication to be transmitted by the parent node overlaps in time with the communication by the child node;
    modify one or both of a schedule or the configuration for the communication in accordance with the interference information; and
    transmit the communication in accordance with the modified one or both of the schedule or the configuration.

27. A parent node of a child node in an integrated access backhaul (IAB) network, comprising:
  one or more memories storing processor-readable code; and
  one or more processors coupled with the one or more memories, at least one of the one or more processors operable to cause the parent node to:
    receive, from the child node of the TAB network via a wireless backhaul link between the parent node and the child node, communication information associated with a communication to be transmitted by the child node, the communication information including a configuration for a communication by the child node, the configuration including a beam index and one or more of a target receive power or a target transmit power, the child node being an TAB node, and the parent node being an IAB donor or an intervening TAB node between the TAB node and an IAB donor;
    determine one or more of a schedule or a configuration for a communication by the parent node in accordance with the communication information associated with the communication by the child node;
    transmit interference information for the communication by the parent node, the interference information indicating that a communication to be transmitted by the parent node overlaps in time with the communication by the child node; and
    receive the communication by the child node in accordance with a modified schedule or a modified configuration, the communication by the child node being received in accordance with the modified schedule or the modified configuration responsive to transmitting the interference information for the communication by the parent node.

* * * * *